(12) United States Patent
Mericas

(10) Patent No.: US 7,086,035 B1
(45) Date of Patent: Aug. 1, 2006

(54) METHOD AND SYSTEM FOR COUNTING NON-SPECULATIVE EVENTS IN A SPECULATIVE PROCESSOR

(75) Inventor: Alexander Erik Mericas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 997 days.

(21) Appl. No.: 09/310,912

(22) Filed: May 13, 1999

(51) Int. Cl.
*G06F 9/45* (2006.01)

(52) U.S. Cl. .................................. 717/127
(58) Field of Classification Search .......... 717/4, 717/127, 233, 234, 236, 237, 239
See application file for complete search history.

(56) References Cited

U.S. PATENT DOCUMENTS

| | | | |
|---|---|---|---|
| 4,231,106 A | 10/1980 | Heap et al. | 702/186 |
| 5,151,981 A | 9/1992 | Westcott et al. | 714/50 |
| 5,237,684 A * | 8/1993 | Record et al. | 709/302 |
| 5,305,454 A * | 4/1994 | Record et al. | 709/302 |
| 5,446,876 A | 8/1995 | Levine et al. | 714/47 |
| 5,493,673 A | 2/1996 | Rindos, III et al. | 713/502 |
| 5,528,753 A | 6/1996 | Fortin | 714/35 |
| 5,557,548 A | 9/1996 | Gover et al. | 702/176 |
| 5,572,672 A | 11/1996 | Dewitt et al. | 714/47 |
| 5,748,855 A | 5/1998 | Levine et al. | 712/23 |
| 5,790,843 A | 8/1998 | Borkenhagen et al. | 712/226 |
| 5,809,450 A | 9/1998 | Chrysos et al. | 702/186 |
| 5,835,705 A * | 11/1998 | Larsen et al. | 714/47 |
| 5,958,009 A * | 9/1999 | Friedrich et al. | 709/224 |
| 6,018,759 A * | 1/2000 | Doing et al. | 709/108 |
| 6,092,095 A * | 7/2000 | Maytal | 709/100 |
| 6,105,087 A * | 8/2000 | Rivoir | 710/100 |
| 6,112,236 A * | 8/2000 | Dollin et al. | 709/224 |
| 6,230,313 B1 * | 5/2001 | Callahan, II et al. | 717/4 |

FOREIGN PATENT DOCUMENTS

| | | |
|---|---|---|
| JP | 11-500551 | 1/1999 |
| JP | 01-230131 | 9/1999 |
| JP | 2000-215081 | 8/2000 |

OTHER PUBLICATIONS

Goldberg et al., Restoring Consistent Global States of Distributed Computations, 1991, p. 144-154.*
Robinson, Capacity and Performance Analysis of Computer Systems, 1994, p. 34-41.*

* cited by examiner

*Primary Examiner*—John Chavis
(74) *Attorney, Agent, or Firm*—Duke W. Yee; Diana R. Gerhardt; Stephen R. Tkacs

(57) ABSTRACT

A method and system for counting non-speculative events in a speculative processor is provided. The speculative processor contains a number of counters within a performance monitor for counting occurrences of specified events within a data processing system. An event to be monitored is specified. The specified event is monitored during the execution of instructions by the speculative processor. A count of occurrences of the specified event for all instructions executed by the speculative processor is generated, and a count of occurrences of the specified event for instructions completely executed by the speculative processor is generated. A difference between the count of occurrences of the specified event for all instructions and the count of occurrences of the specified event for all completed instructions may be generated as a count of occurrences of the specified event for instructions speculatively executed by the speculative processor.

17 Claims, 5 Drawing Sheets

METHOD AND SYSTEM FOR COUNTING NON-SPECULATIVE EVENTS IN A SPECULATIVE PROCESSOR

BACKGROUND OF THE INVENTION

1. Technical Field

The present invention relates generally to an improved data processing system and, in particular, to a method and system for monitoring performance within a data processing system.

2. Description of Related Art

In typical computer systems utilizing processors, system developers desire optimization of software execution for more effective system design. Usually, studies are performed to determine system efficiency in a program's access patterns to memory and interaction with a system's memory hierarchy. Understanding the memory hierarchy behavior helps in developing algorithms that schedule and/or partition tasks, as well as distribute and structure data for optimizing the system.

Within state-of-the-art processors, facilities are often provided which enable the processor to count occurrences of software-selectable events and to time the execution of processes within an associated data processing system. These facilities are known as the performance monitor of the processor. Performance monitoring is often used to optimize the use of software in a system. A performance monitor is generally regarded as a facility incorporated into a processor to monitor selected characteristics to assist in the debugging and analyzing of systems by determining a machine's state at a particular point in time. Often, the performance monitor produces information relating to the utilization of a processor's instruction execution and storage control. For example, the performance monitor can be utilized to provide information regarding the amount of time that has passed between events in a processing system. As another example, software engineers may utilize timing data from the performance monitor to optimize programs by relocating branch instructions and memory accesses. In addition, the performance monitor may be utilized to gather data about the access times to the data processing system's L1 cache, L2 cache, and main memory. Utilizing this data, system designers may identify performance bottlenecks specific to particular software or hardware environments. The information produced usually guides system designers toward ways of enhancing performance of a given system or of developing improvements in the design of a new system.

Events within the data processing system are counted by one or more counters within the performance monitor. The operation of such counters is managed by control registers, which are comprised of a plurality of bit fields. In general, both control registers and the counters are readable and writable by software. Thus, by writing values to the control register, a user may select the events within the data processing system to be monitored and specify the conditions under which the counters are enabled.

To evaluate the efficiency of a processor, it is necessary to determine how much work is performed and how many resources are consumed on behalf of executing instructions. Many modern processors implement speculative processing to achieve high performance. As a result, some of the instructions that are processed may be canceled or flushed without completely executing because the condition for which they were speculatively executed did not occur. Like any other instruction, speculative instructions consume resources within the processor. Most modern processors implement performance monitor counters that count the occurrence of predefined event associated with the use of resources. However, in a processor with both performance monitoring and speculative execution of instructions, performance monitor counters count events for both non-speculative instructions, i.e. instructions which complete execution, and speculative instructions, i.e. instructions which do not complete.

Therefore, it would be advantageous to have a method and system for monitoring the use of resources accurately within a processor that performs speculative execution of instructions. It would be further advantageous to have a method and system for comparing the use of resources within a processor between completed instructions and those instructions that are speculatively executed and not completed.

SUMMARY OF THE INVENTION

The present invention provides a method and system for counting non-speculative events in a speculative processor. The speculative processor contains a number of counters within a performance monitor for counting occurrences of specified events within a data processing system. An event to be monitored is specified. The specified event is monitored during the execution of instructions by the speculative processor. A count of occurrences of the specified event for all instructions executed by the speculative processor is generated, and a count of occurrences of the specified event for instructions completely executed by the speculative processor is generated. A difference between the count of occurrences of the specified event for all instructions and the count of occurrences of the specified event for all completed instructions may be generated as a count of occurrences of the specified event for instructions speculatively executed by the speculative processor.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart depicting a process for computing, using a performance monitor of a speculative processor, a count of event occurrences for a specified event that have been caused by instructions that were speculatively executed.

DETAILED DESCRIPTION OF THE PREFERRED EMBODIMENT

Figure 1:
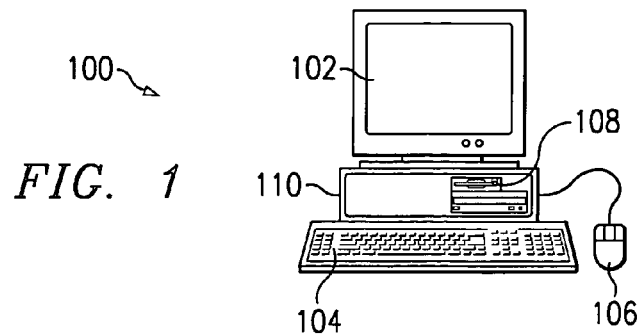
FIG. 1 is a pictorial representation depicting a data processing system in which the present invention may be implemented in accordance with a preferred embodiment of the present invention.

With reference now to FIG. 1, a pictorial representation depicts a data processing system in which the present invention may be implemented in accordance with a preferred embodiment of the present invention. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Computer 100 can be implemented using any suitable computer. Although the depicted representation shows a personal computer, other embodiments of the present invention may be implemented in other types of data processing systems, such as mainframes, workstations, network computers, Internet appliances, palm computers, etc. System unit 110 comprises memory, a central processing unit, I/O unit, etc. However, in the present invention, system unit 110 contains a speculative processor, either as the central processing unit or as one of multiple CPUs present in the system unit.

Figure 2:
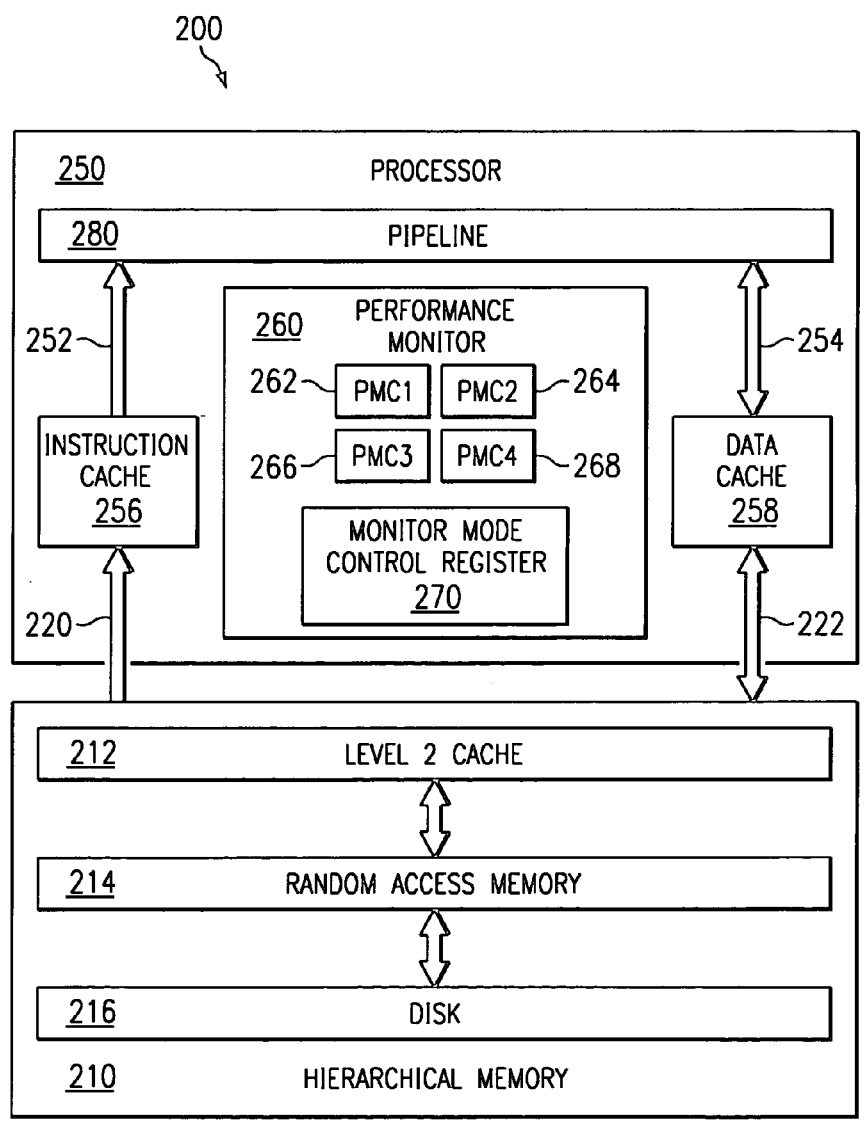
FIG. 2 is a block diagram depicting selected, internal, functional units of a data processing system for processing information in accordance with a preferred embodiment of the present invention.

With reference now to FIG. 2, a block diagram depicts selected internal functional units of a data processing system for processing information in accordance with a preferred embodiment of the present invention. System 200 comprises hierarchical memory 210 and processor 250. Hierarchical memory 210 comprises Level 2 cache 212, random access memory (RAM) 214, and disk 216. Level 2 cache 212 provides a fast access cache to data and instructions that may be stored in RAM 214 in a manner which is well-known in the art. RAM 214 provides main memory storage for data and instructions that may also provide a cache for data and instructions stored on non-volatile disk 216.

Data and instructions may be transferred to processor 250 from hierarchical memory 210 on instruction transfer path 220 and data transfer path 222. Transfer path 220 and data transfer path 222 may be implemented as a single bus or as separate buses between processor 250 and hierarchical memory 210. Alternatively, a single bus may transfer data and instructions between processor 250 and hierarchical memory 210 while processor 250 provides separate instruction and data transfer paths within processor 250, such as instruction bus 252 and data bus 254.

Processor 250 also comprises instruction cache 256, data cache 258, performance monitor 260, and instruction pipeline 280. Performance monitor 260 comprises performance monitor counter (PMC1) 262, performance monitor counter (PMC2) 264, performance monitor counter (PMC3) 266, performance monitor counter (PMC4) 268, and monitor mode control register (MMCR) 270. Alternatively, processor 250 may have other counters and control registers not shown.

Processor 250 includes a pipelined processor capable of executing multiple instructions in a single cycle, such as the PowerPC family of reduced instruction set computing (RISC) processors. During operation of system 200, instructions and data are stored in hierarchical memory 210. Instructions to be executed are transferred to instruction pipeline 280 via instruction cache 256. Instruction pipeline 256 decodes and executes the instructions that have been staged within the pipeline. Some instructions transfer data to or from hierarchical memory 210 via data cache 258. Other instructions may operate on data loaded from memory or may control the flow of instructions.

Performance monitor 260 comprises event detection and control logic, including PMC1–PCM4 262–268 and MMCR 270. Performance monitor 260 is a software-accessible mechanism intended to provide detailed information with significant granularity concerning the utilization of processor instruction execution and storage control. The performance monitor may include an implementation-dependent number of performance monitor counters (PMCs) used to count processor/storage related events. These counters may also be termed "global counters". The MMCRs establish the function of the counters with each MMCR usually controlling some number of counters. The PMCs and the MMCRs are typically special purpose registers physically residing on the processor. These registers are accessible for read or write operations via special instructions for that purpose. The write operation is preferably only allowed in a privileged or supervisor state, while reading is preferably allowed in a problem state since reading the special purpose registers does not change a register's content. In a different embodiment, these registers may be accessible by other means such as addresses in I/O space. In the preferred embodiment, PMC1–PMC4 are 32-bit counters and MMCR is a 32-bit register. One skilled in the art will appreciate that the size of the counters and the control registers are dependent upon design considerations, including the cost of manufacture, the desired functionality of processor 250, and the chip area available within processor 250.

Performance monitor 260 monitors the entire system and accumulates counts of events that occur as the result of processing instructions. In the present invention, processor 250 allows instructions to execute out-of-order with respect to the order in which the instructions were coded by a programmer or were ordered during program compilation by a compiler. Processor 250 also employs speculative execution to predict the outcome of conditional branches of certain instructions before the data on which the certain instructions depend is available. The MMCRs are partitioned into bit fields that allow for event/signal selection to be recorded/counted. Selection of an allowable combination of events causes the counters to operate concurrently. When the performance monitor is used in conjunction with speculatively executed instructions in the manner provided by the present invention, the performance monitor may be used as a mechanism to monitor the performance of the processor during execution of both completed instructions and speculatively executed yet uncompleted instructions.

Figure 3:
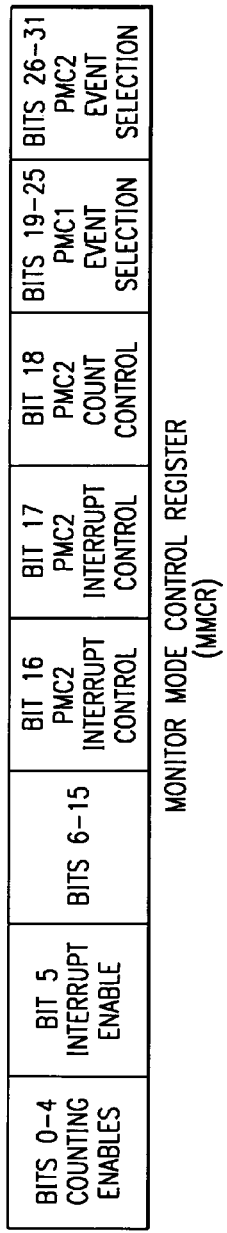
FIG. 3 is an illustration providing an example representation of one configuration of a monitor mode control register suitable for controlling the operation of two performance monitor counters.

With reference now to FIG. 3, an illustration provides an example representation of one configuration of an MMCR suitable for controlling the operation of two PMCs. As shown in the example, an MMCR is partitioned into a number of bit fields whose settings select events to be counted, enable performance monitor interrupts, and specify the conditions under which counting is enabled. Alternatively, an MMCR may set an initialization count value, which is not shown in the figures.

The initialization count value is both variable and software selectable. The initialization count value may be loaded into a counter when an instruction is first scheduled for execution. For example, given that the event under study is "register accesses", if the initialization count value denotes a number of register accesses for an associated instruction, then completion of the instruction allows the number of register accesses for the particular instruction to be added to the total event count in a PMC that counts all register accesses by all instructions. Of course, depending on the data instruction being executed, "complete" may have different meanings. For example, for a "load" instruction, "complete" indicates that the data associated with the instruction was received, while for a "store" instruction, "complete" indicates that the data was successfully written. A user-readable counter, e.g., PMC1, then provides software access of the total number of register accesses since PMC1 was first initialized. With the appropriate values, the performance monitor is readily suitable for use in identifying system performance characteristics.

Bits 0–4 and 18 of the MMCR in FIG. 3 determine the scenarios under which counting is enabled. By way of example, bit 0 may be a freeze counting bit such that when the bit is set, the values in the PMCs are not changed by hardware events, i.e. counting is frozen. Bits 1–4 may indicate other specific conditions under which counting is performed. Bits 5, 16, and 17 are utilized to control interrupt signals triggered by PMCs. Bits 6–9 may be utilized to control time or event-based transitions. Bits 19–25 may be used for event selection for PMC1, i.e. selection of signals to be counted for PMC1. The function and number of bits may be chosen as necessary for selection of events as needed within a particular implementation.

At least one counter is required to capture data for some type of performance analysis. More counters provide for faster or more accurate analysis. If the monitored scenario is strictly repeatable, the same scenario may be executed with different items being selected. If the scenario is not strictly repeatable, then the same scenario may be executed with the same item selected multiple times to collect statistical data. The time from the start of the scenario is assumed to be available via system time services so that intervals of time may be used to correlate the different samples and different events.

Figure 4:
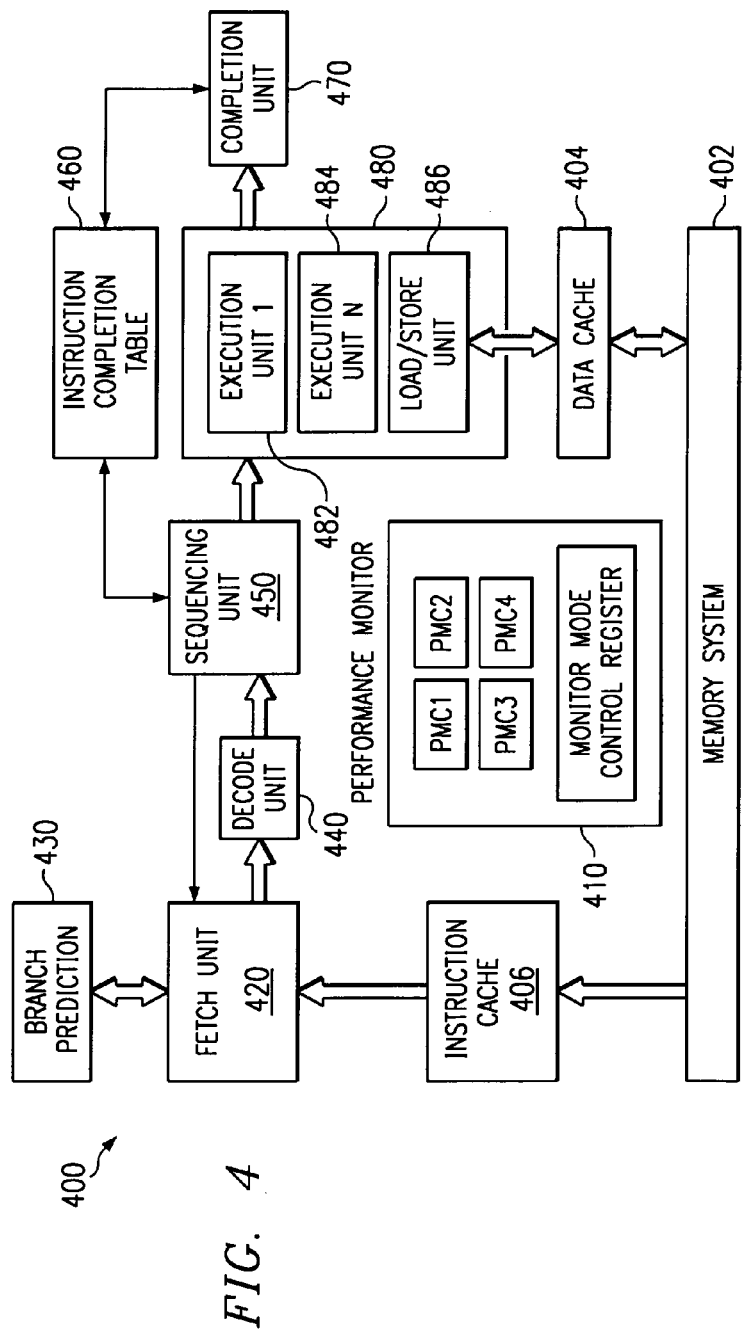
FIG. 4 is a block diagram depicting further detail of the stages of an instruction pipeline within an out-of-order, speculative execution processor.

With reference now to FIG. 4, a block diagram depicts further detail of the stages of an instruction pipeline within an out-of-order, speculative execution processor. System 400 shows memory system 402, data cache 404, instruction cache 406, and performance monitor 410, which may be similar to the hierarchical memory, data cache, instruction cache, and performance monitor shown in FIG. 3. As instructions are executed, they cause events within the processor, such as cache accesses. Performance monitor 410 contains a plurality of PMCs that count events under the control of one or more MMCRs. The counters and the MMCRs are internal processor registers and can be read or written under software control.

Fetch unit 420 retrieves instructions from instruction cache 406, which in turn retrieves instructions from memory 402. Decode unit 440 decodes instructions to determine basic information about the instruction, such as instruction type, source registers, and destination registers. Sequencing unit 450 uses the decoded information to schedule instructions for execution. In order to track instructions, completion table 460 is used for storing and retrieving information about scheduled instructions. As sequencing unit 450 assigns the dispatched instruction to an associated entry in completion table 460, sequencing unit 450 assigns or associates entries to executing instructions on a first-in, first-out basis or rotating manner. As the instructions are executed, information concerning the executing instructions is stored into various fields and subfields of the associated entry of completion table 460 for the particular instruction.

Instructions executed by execution control unit 480 using one of the execution units 1–N, such as execution unit #1 482 or execution unit #N 484, may use load/store unit 486 to cause data to be read from or written to memory 402 via data cache 404. As instructions complete, completion unit 410 commits the results of the execution of the instructions, and the destination registers of the instructions are made available for use by subsequent instructions. Any instructions may be issued to the appropriate execution unit as soon as its source registers are available.

Instructions are fetched and completed sequentially until a control (branch) instruction alters the instruction flow, either conditionally or unconditionally. A control instruction specifies a new data location from which to begin fetching instructions. When fetch unit 420 receives a conditional branch operation and the data upon which the condition is based is not yet available (e.g., the instruction that will produce the necessary data has not been executed), fetch unit 420 may use one or more branch prediction mechanisms in branch prediction control unit 430 to predict the outcome of the condition. Control is then speculatively altered until the results of the condition can be determined. If the branch was correctly predicted, operation continues. If the prediction was incorrect, all instructions along the speculative path are canceled or flushed.

Since speculative instructions can not complete until the branch condition is resolved, many high performance out-of-order processors provide a mechanism to map physical registers to virtual registers. The result of execution is written to the virtual register when the instruction has finished executing. Physical registers are not updated until an instruction actually completes. Any instructions dependent upon the results of a previous instruction may begin execution as soon as the virtual register is written. In this way, a long stream of speculative instructions can be executed before determining the outcome of the conditional branch.

Figure 5:
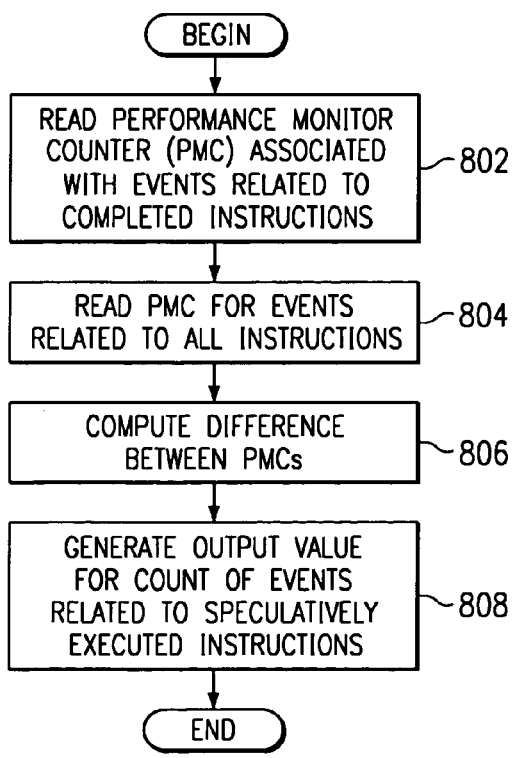
FIG. 5 is a diagram depicting an instruction completion table that may be used in a speculative processor.

With reference now to FIG. 5, a diagram illustrates an instruction completion table that may be used in a speculative processor. Completion table 500 is organized as a circular list with each entry in completion table 500 tracking a single instruction. An instruction is said to have a "tag value" equal to its index value into completion table 500. The tag value associated with an instruction may be used to identify events caused by the execution of the instruction. Allocation tag 502 holds the index of the next available entry. Completion tag 504 holds the index of a completing instruction. If no completion table entries are available, the sequencing unit of the processor stalls until an entry is available.

FIG. 5 shows exemplary data within completion table 500 in which the completion tag points to entry 3 and the allocation tag points to entry 6. The instruction in entry 3 is next to complete. Instructions in entries 4–5 can be waiting to execute, currently executing, or waiting to complete. The next instruction that is decoded will be placed into entry 6 and the allocation pointer will increment to point to entry 7. If the allocation pointer points to entry 15, then it will wrap to zero instead of incrementing to non-existent entry 16, i.e.

the pointers wrap in a circular fashion. In this example, if the allocation pointer pointed to entry 2, no more entries would be available.

Alternatively, a single completion table entry may be allocated for a group of instructions. All of the instructions within the group would then be tracked with a single tag value.

Figure 6:
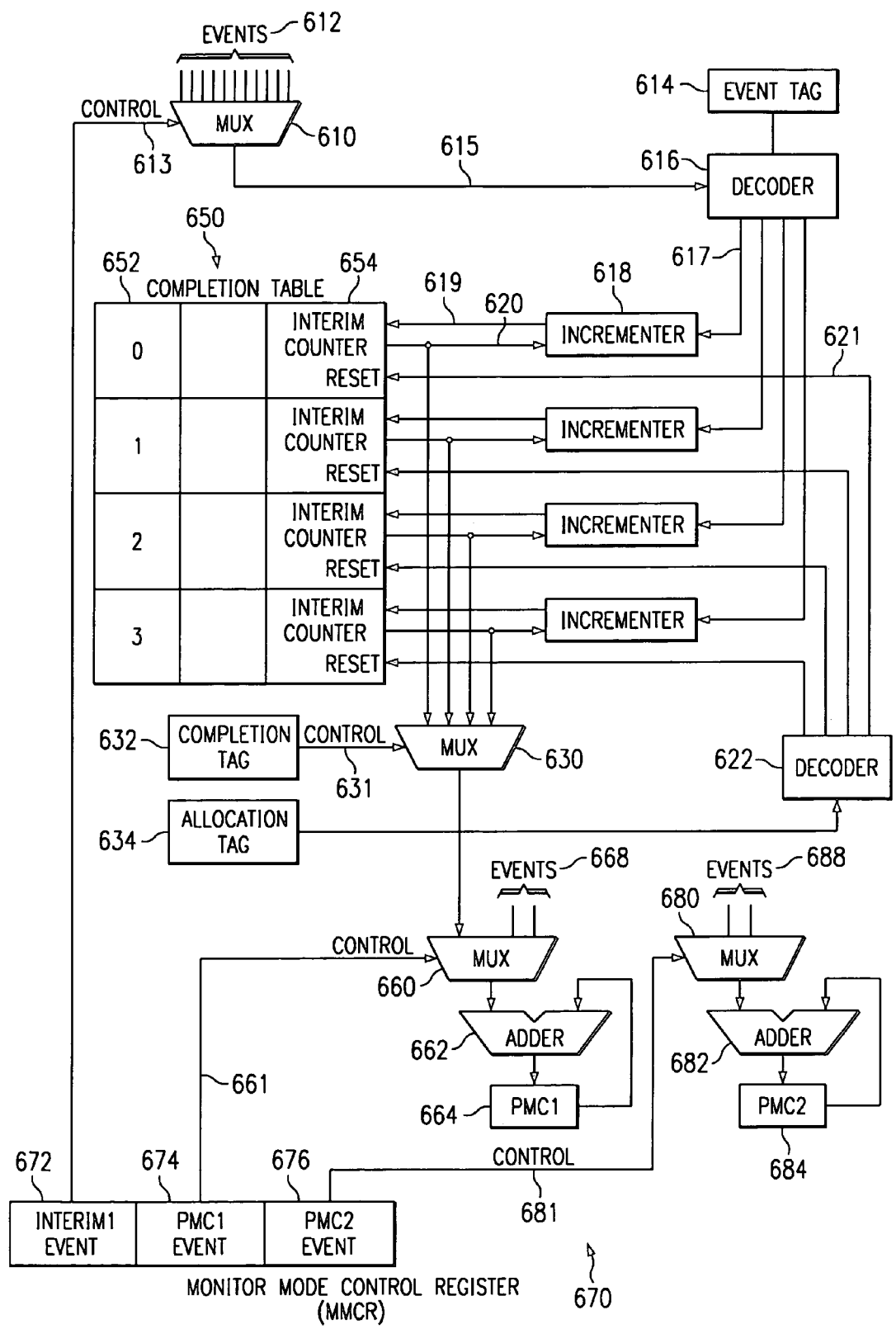
FIG. 6 is a diagram depicting a processor for counting events that are related to speculatively executed instructions separately from events that are related to completed instructions in accordance with the method of the present invention.

With reference now to FIG. 6, a diagram depicts a processor for counting events related to speculatively executed instructions separately from events related to completed instructions. The completion of instructions are tracked through completion table 650. Each table entry has an associated tag value 652. An instruction's tag value is the entry's position in the table for the instruction, which allows the processor to identify the instruction which caused an event or events within the processor. As instructions "move through the system" (or execute), they generate events 612, which are signals that a particular event or condition has occurred. Along with the event signal, event tag 614 is used to identify which instruction has caused the event associated with the event signal.

Completion table 650 is extended to include one or more interim counters 654 per entry. The interim counters hold the count of occurrences for monitored events that are caused by instructions that may never complete (speculative execution). The monitored event for an interim counter is controlled by field 672 in MMCR 670. The contents of field 672 are used to generate signal 613 to control multiplexor 610 which filters event signals 612. Event tag 614 is used to route selected event signal 615 through decoder 616 to the appropriate instruction's interim counter. Interim counter 654 is incremented by sending control signal 617 from decoder 616 to incrementer 618, reading interim counter through input 620, incrementing the value read from the counter, and writing the value back to interim counter through output 619. The interim counter value is incremented by incrementer 618, which can be dedicated to a particular interim counter, as shown in FIG. 6. Alternatively, a single incrementer may be shared by all counters.

One or more PMCs are used to count occurrences of monitored events as controlled by fields in one or more MMCRs. Field 674 is used to generate control signal 661 so that PMC1 664 accepts interim counts from the interim counters. Interim counts for events stored in the interim counters will be added to the original value of PMC1 664 by adder 662 and then stored back in PMC1 664. When an instruction completes, completion tag 632 holds the completing instruction's index into Completion Table 1650. Completion tag 632 is used to control multiplexor 630 by control signal 631 to steer the contents of the completing instruction's interim counter(s) to multiplexor 660 controlled by field 674 in the MMCR. If multiplexor 660 is appropriately controlled with signal 661, events 668 will cause an interim count value to be sent to adder 662 that updates the PMC.

FIG. 6 depicts interim counters as physical extensions of the instruction completion table. Alternatively, the interim counters may be physically separate from the completion table yet may still be indexed by the event tag, allocation tag, and completion tag. FIG. 6 also depicts an incrementer associated with the interim counters. Alternatively, count values may be written directly into the interim counters. For example, the load/store unit of the processor may write the number of bytes read or written by an executing instruction. For processors that use a single completion table entry to track a group of multiple instructions, an interim counter can be loaded with the number of instructions in the group. In this manner, the number of completed instructions may be counted.

If an instruction is canceled, its entry in completion table 650 will be re-allocated, and the associated counts of occurrences of events for the non-completed instruction are lost. Allocation tag 634 contains the index into completion table 650 that is used to control decoder 622 to send a reset signal, such as reset signal 621, to the appropriate interim counter(s) causing the value(s) to be zeroed.

In a manner similar to PMC1, field 676 is used to generate control signal 681 so that PMC2 684 accepts interim counts from the interim counters. Interim counts for events stored in the interim counters will be added to the original value of PMC2 684 by adder 682 and then stored back in PMC1 684. If multiplexor 680 is appropriately controlled with signal 681, events 688 will cause an appropriate count value (not shown) to be sent to adder 682 that updates the PMC.

In the example described above, PMC1 counts the occurrences of a specified event related to completing instructions. In the manner provided by the present invention, PMC2 may count events related to all instructions, including events that are related to the execution of instructions that complete and events that are related to the execution of instructions that are speculatively executed and do not complete. In this manner, the present invention provides a method to count only events caused by instructions that actually complete. If the events that can be counted by the PMCs include the interim counter as well as the events that are routed to the interim counters, some PMCs can accumulate total event counts for all instructions while other PMCs may accumulate only non-speculative event counts for instructions that complete. The difference between the total counts and the non-speculative counts is the number of event occurrences caused by speculatively executed instructions that were canceled.

Figure 7:
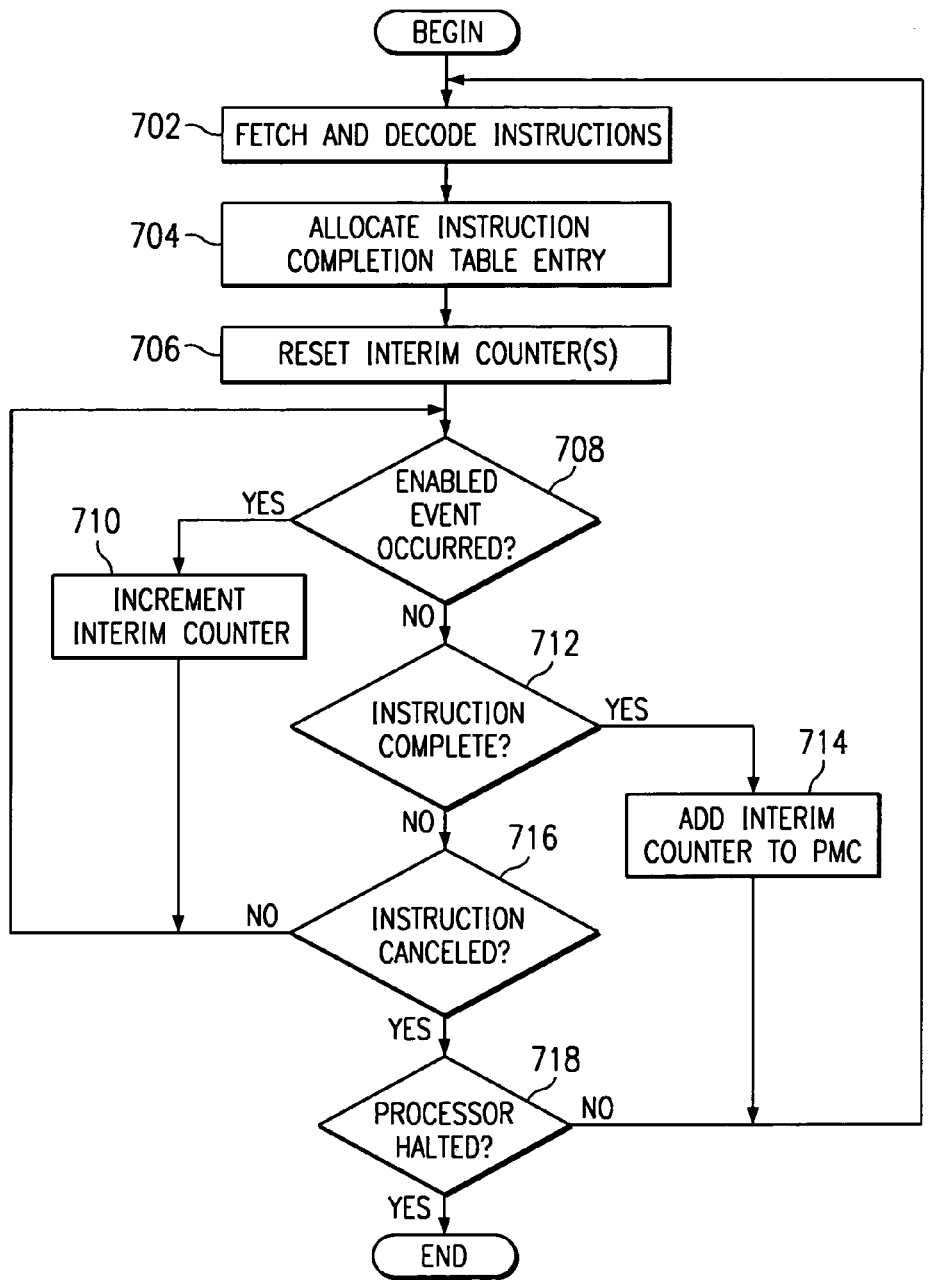
FIG. 7 is a flowchart depicting a process for accumulating a count of event occurrences for a specified event that have been caused by instructions that complete (non-speculative event counts) within a performance monitor of a speculative processor in accordance with an embodiment of the present invention.

With reference now to FIG. 7, a flowchart depicts a process for accumulating a count of event occurrences for a specified event that have been caused by instructions that complete (non-speculative event counts) within a performance monitor of a speculative processor in accordance with an embodiment of the present invention. The process begins by fetching and decoding instructions (step 702). After an entry in the completion table is allocated for the fetched and decoded instruction (step 704), the interim counter associated with the completion table entry is reset (step 706). While the particular instruction is being executed, a determination is made as to whether an enabled event has occurred (step 708). If so, then the interim counter associated with the completion table entry is incremented (step 710), and the process loops back to continue monitoring the execution of the processor.

If an enabled event has not occurred, then a determination is made as to whether an instruction has completed execution (step 712). If so, then the interim counter is added to the appropriate PMC, and the process loops back to fetch and decode another instruction. If an instruction has not completed, then a determination is made as to whether an instruction has been canceled (step 716). If not, then the process loops back to continue monitoring the execution of the processor. If an instruction has been canceled, a determination is made as to whether the processor has been halted (step 718). If not, then the process loops back to fetch and decode another instruction. If the processor is being halted, then the process is terminated.

Alternatively, the process may loop back to fetch and decode at multiple points during the process. The important point is that the flowchart depicts an essentially non-terminating loop that is logically executed while the performance monitoring functionality of the processor is enabled.

With reference now to FIG. 8, a flowchart depicts a process for computing, using a performance monitor of a speculative processor, a count of event occurrences for a specified event that have been caused by instructions that were speculatively executed. As noted above, special registers within a performance monitor are accessible to software, such as a software package analyzing the performance of the hardware within the processor.

The process begins when the software reads the PMC responsible for the count of events associated with completed instructions (step 802). The software then reads the PMC responsible for the count of events associated with all instructions (step 804). A difference is then computed between the values read from the PMCs (step 806), and an output value is generated for the count of events related to speculatively executed instructions (step 808).

The advantages provided by the present invention are apparent in light of the detailed description of the invention provided above. Under certain conditions, it is possible for the performance of a speculative processor to be severely degraded by the speculative execution of instructions that do not complete yet consume processor resources during their partial execution stages. The present invention provides a method and system for monitoring the performance of speculatively executed instructions so that a system designer can ensure that speculative execution of instructions does not severely degrade the performance of the processor.

For example, speculative instructions consume resources within the processor, such as memory bandwidth. The performance of memory access operations, especially when they miss the first level cache, becomes an important consideration since computer systems are forced to use hierarchical memory sub-systems due to the cost sensitivity of the systems. Generally, no memory hierarchy can achieve the ideal performance of all memory locations being accessed as promptly as general purpose registers. The key concept of a hierarchical memory system is that memory accesses usually will be immediately satisfied by first level cache accesses. Expectedly, there will be infrequent but costly first level cache misses. It is desirable that the processor be able to execute efficiently in the presence of first level cache misses. Therefore, one design objective is to utilize a memory hierarchy as efficiently as possible.

One method of efficiently utilizing hierarchical memory systems is to implement out-of-order execution. This gives instructions in the vicinity of instructions incurring first level cache misses the opportunity to execute during the interval when the memory access instructions are delayed by these misses. One of the completion unit's main tasks is to reorder, in an architecturally valid manner, the instructions that are executed out-of-order. One of the main obstacles to executing instructions out-of-order is the serialization of instructions to deal with architectural dependencies. Because a superscalar processor may have instruction level parallelism, it is not enough to simply know that there is a first level cache miss because it may not be causing any delays in the completion of the other instructions, especially when it delays the completion of instructions. The very nature of out-of-order execution causes this to be difficult to ascertain.

As one example of an advantage provided by the present invention, delay effects on the completion of out-of-order execution may be measured for those cycles that are lost due to first level cache misses of speculatively executed instructions that complete. Once specific problems that create such stalls are identified and their relative importance are ascertained, the data may be used to make compiler changes, software changes, and/or hardware design changes. In general, this is one method of monitoring the performance of the branch unit operation. Branch prediction is a large part of branch unit operation. By tracking the counts of events related to the use of resources by instructions that do not complete, one may evaluate the effectiveness of the prediction logic.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of monitoring events within a data processing system comprising a speculative processor and a plurality of counters, wherein each counter among said plurality of counters counts occurrences of specified events within the data processing system, the method comprising:

specifying an event to be monitored;

monitoring for the specified event during the execution of instructions by the speculative processor;

generating a count of occurrences of the specified event for all instructions executed by the speculative processor; and generating a count of occurrences of the specified event for instructions completely executed by the speculative processor.

2. The method of 1 further comprising:

computing a difference between the count of occurrences of the specified event for all instructions and the count of occurrences of the specified event for all completed instructions as a count of occurrences of the specified event for instructions speculatively executed by the speculative processor.

3. The method of 1 further comprising:

monitoring a plurality of specified events for each instruction executed by the speculative processor.

4. A method of monitoring events within a data processing system comprising a speculative processor and a plurality of counters, wherein each counter among said plurality of counters counts occurrences of specified events within the data processing system, the method comprising:

associating an interim counter with a particular instruction;

associating a first global event counter with all instructions;

associating a second global event counter with completed instructions;

specifying an event to be monitored;

monitoring for the specified event during execution of instructions by the speculative processor;

in response to detecting an occurrence of the event during execution of the particular instruction, incrementing the interim counter;

in response to detecting an occurrence of the event during execution of any instruction, incrementing the first global counter; and in response to detecting a completion of the particular instruction, adding event counts from the interim counter to the second global event counter.

5. The method of 4 further comprising:

computing a difference between event counts from the first global event counter and event counts from the second global event counter as a count of occurrences of the specified event for instructions speculatively executed by the speculative processor.

6. A method of computing a count of events within a data processing system comprising a speculative processor and a plurality of counters, wherein each counter among said plurality of counters counts occurrences of specified events within the data processing system, the method comprising:

reading from a first counter a count of occurrences of a specified event for all instructions executed by the speculative processor;

reading from a second counter a count of occurrences of the specified event for instructions completely executed by the speculative processor; and computing a difference between the count of occurrences of the specified event for all instructions and the count of occurrences of the specified event for all completed instructions as a count of occurrences of the specified event for instructions speculatively executed by the speculative processor.

7. A method of monitoring events within a data processing system comprising a speculative processor and a plurality of counters, wherein each counter among said plurality of counters counts occurrences of specified events within the data processing system, the method comprising:

specifying events to be monitored;

monitoring said specified events;

in response to detecting an occurrence of a particular specified event, incrementing a first counter and a second counter; and in response to detecting a completion of an instruction, adding the second counter to a third counter.

8. The method of 7 wherein the first counter counts occurrences of a particular specified event for all instructions executed by the speculative processor.

9. The method of 7 wherein the second counter counts occurrences of a particular specified event for a particular instruction.

10. The method of 7 wherein the third counter counts occurrences of a particular specified event for instructions completely executed by the speculative processor.

11. The method of 7 further comprising:

computing a difference between the first counter and the third counter to generate a count of occurrences of a particular specified event for speculatively executed instructions.

12. An apparatus for monitoring events within a data processing system comprising a speculative processor and a plurality of counters, wherein each counter among said plurality of counters counts occurrences of specified events within the data processing system, the apparatus comprising:

means for specifying an event to be monitored;

means for monitoring for the specified event during the execution of instructions by the speculative processor;

first means for generating a count of occurrences of the specified event for all instructions executed by the speculative processor; and second means for generating a count of occurrences of the specified event for instructions completely executed by the speculative processor.

13. The apparatus of 12 further comprising:

means for computing a difference between the count of occurrences of the specified event for all instructions and the count of occurrences of the specified event for all completed instructions as a count of occurrences of the specified event for instructions speculatively executed by the speculative processor.

14. The method of 12 further comprising:

means for monitoring a plurality of specified events for each instruction executed by the speculative processor.

15. A system for computing a count of events within a speculative processor comprising a plurality of counters, wherein each counter among said plurality of counters counts occurrences of specified events within the speculative processor, the system comprising:

first means for reading from a first counter a count of occurrences of a specified event for all instructions executed by the speculative processor;

second means for reading from a second counter a count of occurrences of the specified event for instructions completely executed by the speculative processor; and means for computing a difference between the count of occurrences of the specified event for all instructions and the count of occurrences of the specified event for all completed instructions as a count of occurrences of the specified event for instructions speculatively executed by the speculative processor.

16. A computer program product on a computer-readable medium for monitoring events within a data processing system comprising a speculative processor and a plurality of counters, wherein each counter among said plurality of counters counts occurrences of specified events within the data processing system, the computer-program product comprising:

first instructions for specifying an event to be monitored;

second instructions for monitoring for the specified event during the execution of instructions by the speculative processor;

third instructions for generating a count of occurrences of the specified event for all instructions executed by the speculative processor; and fourth instructions for generating a count of occurrences of the specified event for instructions completely executed by the speculative processor.

17. A computer program product on a computer-readable medium for computing a count of events within a speculative processor comprising a plurality of counters, wherein each counter among said plurality of counters counts occurrences of specified events within the speculative processor, the computer program product comprising:

first instructions for reading from a first counter a count of occurrences of a specified event for all instructions executed by the speculative processor;

second instructions for reading from a second counter a count of occurrences of the specified event for instructions completely executed by the speculative processor; and third instructions for computing a difference between the count of occurrences of the specified event for all instructions and the count of occurrences of the specified event for all completed instructions as a count of occurrences of the specified event for instructions speculatively executed by the speculative processor.

* * * * *